US012072644B1

(12) United States Patent
Izumi

(10) Patent No.: US 12,072,644 B1
(45) Date of Patent: Aug. 27, 2024

(54) IMAGE FORMING APPARATUS

(71) Applicant: TOSHIBA TEC KABUSHIKI KAISHA, Tokyo (JP)

(72) Inventor: Takao Izumi, Yokohama Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/355,558

(22) Filed: Jul. 20, 2023

(51) Int. Cl.
*G03G 15/08* (2006.01)
*G03G 15/00* (2006.01)

(52) U.S. Cl.
CPC ..... *G03G 15/0868* (2013.01); *G03G 15/0856* (2013.01); *G03G 15/5016* (2013.01); *G03G 15/5025* (2013.01); *G03G 15/5041* (2013.01); *G03G 2215/0187* (2013.01); *G03G 2215/066* (2013.01)

(58) Field of Classification Search
CPC ........... G03G 15/0856; G03G 15/0868; G03G 15/0131; G03G 15/0194; G03G 15/5016; G03G 15/5025; G03G 15/5041; G03G 15/5058; G03G 15/556; G03G 2215/0187; G03G 2215/066
USPC ............................................... 399/27, 30, 49
See application file for complete search history.

(56) References Cited

U.S. PATENT DOCUMENTS

2010/0272453 A1* 10/2010 Fujiwara .............. G03G 15/065 399/49
2011/0280594 A1 11/2011 Tanaka
2011/0280602 A1* 11/2011 Takenaka ........... G03G 15/1605 399/45
2016/0291507 A1 10/2016 Nakayama et al.
2018/0203394 A1* 7/2018 Okada .................. G03G 15/553

FOREIGN PATENT DOCUMENTS

JP 2007-86332 4/2007

* cited by examiner

*Primary Examiner* — Hoang X Ngo
(74) *Attorney, Agent, or Firm* — Amin, Turocy & Watson, LLP

(57) ABSTRACT

An image forming apparatus includes a forming unit, a supply unit, a first measurement unit, a control unit, a second measurement unit, an adjustment unit, and a changing unit. The forming unit forms a toner image on an image carrier using developer which is contained in a developer container and includes toner and a magnetic carrier. The supply unit supplies the toner to the developer container. The first measurement unit measures a density of the toner in the developer contained in the developer container. The control unit controls the supply unit such that the density measured by the first measurement unit approaches a target density. The second measurement unit measures an image density formed by the forming unit. The adjustment unit adjusts a development contrast potential so that a formation density measured by the second measurement unit approaches a predetermined appropriate density with regard to the toner image formed by the forming unit under a predetermined condition. The changing unit is configured to change a target density if the adjustment unit is not able to adjust the development contrast potential so that the formation density measured by the second measurement unit approaches the appropriate density.

20 Claims, 7 Drawing Sheets

IMAGE FORMING APPARATUS

FIELD

Embodiments described herein relate generally to an image forming apparatus.

BACKGROUND

An image forming apparatus is known as one of apparatuses used in workplaces in order to construct office environments, remote work environments, or the like.

In electrographic image forming apparatuses, a formation density of an image may be changed in accordance with various conditions such as a change in a surrounding environment such as humidity and a degradation of an image carrier or the like.

Therefore, to compensate for the change in the formation density of the image, it is desirable to appropriately perform control such that an image can be formed at a given formation density.

DETAILED DESCRIPTION

In general, according to one embodiment, an image forming apparatus includes a forming unit, a supply unit, a first measurement unit, a control unit, a second measurement unit, an adjustment unit, and a changing unit. The forming unit forms a toner image on an image carrier using developer which is contained in a developer container and includes toner and a magnetic carrier. The supply unit supplies the toner to the developer container. The first measurement unit measures a density of the toner in the developer contained in the developer container. The control unit controls the supply unit such that the density measured by the first measurement unit approaches a target density. The second measurement unit measures an image density formed by the forming unit. The adjustment unit adjusts a development contrast potential so that a formation density measured by the second measurement unit approaches a predetermined appropriate density with regard to the toner image formed by the forming unit under a predetermined condition. The changing unit is configured to change a target density if the adjustment unit is not able to adjust the development contrast potential so that the formation density measured by the second measurement unit approaches the appropriate density.

Hereinafter, embodiments will be described with reference to the drawings. In the following embodiments, a multi-function peripheral (MFP) including an image forming apparatus as a printer will be described as an example.

First, a configuration of the MFP according to an embodiment will be described.

Figure 1:
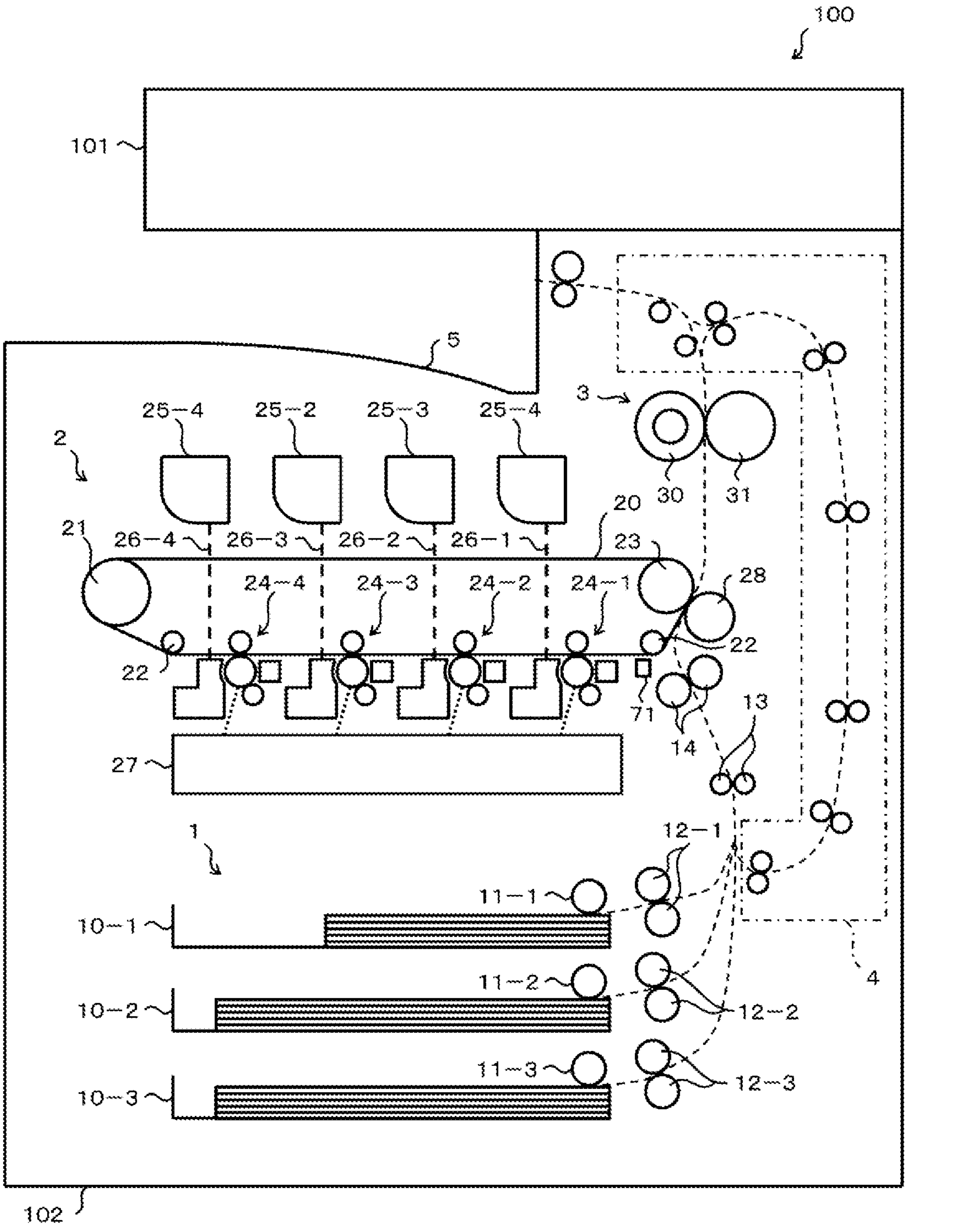
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of a document and generates image data corresponding to the read image. The scanner 101 generates image data corresponding to an optical image reflected from a reading surface of the document, for example, using an image sensor such as a charge-coupled device (CCD) line sensor. The scanner 101 scans a document placed on a document platen using an image sensor moving along the document. Alternately, the scanner 101 scans the document conveyed an auto document feeder (ADF) using a fixed image sensor.

The printer 102 forms an image on a medium on which an image is to be formed in accordance with an electrographic scheme. The medium is generally a print sheet such as a cut sheet. Accordingly, a print sheet is used as a medium in the following description. Here, as the medium, a sheet material other than a cut sheet may be used or a sheet material such as a resin other than paper may be used. The printer 102 has a color printing function of printing a color image on a print sheet and a monochromic printing function of printing a monochromic image on a print sheet. The printer 102 forms a color image by superimposing element images, for example, using toner of three colors of yellow, magenta, and cyan or toner of four colors of black in addition to yellow, magenta, and cyan. The printer 102 forms a monochromic image, for example, using toner of black. Here, the printer 102 may have only one of the color printing function and the monochromic printing function. The printer 102 may additionally have a function of forming a monochromic image using decoloring toner by heating.

In an example configuration illustrated in FIG. 1, the printer 102 includes a sheet feeding unit 1, a printing engine 2, a fixing unit 3, an automatic double-sided unit (ADU) 4, and a sheet discharging tray 5.

The sheet feeding unit 1 includes sheet feeding cassettes 10-1, 10-2, and 10-3, pickup rollers 11-1, 11-2, and 11-3, conveyance rollers 12-1, 12-2, and 12-3, conveyance rollers 13, and resist rollers 14.

The sheet feeding cassettes 10-1, 10-2, and 10-3 accommodate print sheets in a piled state. The print sheets accommodated in the sheet feeding cassettes 10-1, 10-2, and 10-3 may be types of print sheets of which sizes and materials are different or may be the same type of print sheets. The sheet feeding unit 1 may also include an input tray.

The pickup rollers 11-1, 11-2, and 11-3 pick up the print sheets from the sheet feeding cassettes 10-1, 10-2, and 10-3, respectively, one by one. The pickup rollers 11-1, 11-2, and 11-3 send the picked-up print sheets to the conveyance rollers 12-1, 12-2, and 12-3.

The conveyance rollers 12-1, 12-2, and 12-3 convey the print sheets sent by the pickup rollers 11-1, 11-2, and 11-3 to the conveyance rollers 13 via a conveyance path formed by guide members and the like (not illustrated).

The conveyance rollers 13 further convey the print sheet sent from any of the conveyance rollers 12-1, 12-2, and 12-3 and send the print sheet to the resist rollers 14.

The resist rollers 14 correct a tilting of the print sheet. The resist rollers 14 adjust a timing at which the print sheet is sent to the printing engine 2.

The sheet feeding cassettes, the pickup rollers, and the conveyance rollers are not limited to three sets, but any number of sets may be provided. If an input tray is provided, any one set of feeding cassette and pickup and conveyance rollers paired with the feeding cassette may not be provided.

The printing engine 2 includes a belt 20, support rollers 21, 22, and 23, image forming units 24-1, 24-2, and 24-3, 24-4, toner bottles 25-1, 25-2, 25-3, and 25-4, supply mechanisms 26-1, 26-2, 26-3, and 26-4, an exposure unit 27, and a transfer roller 28.

The belt 20 has an endless shape and is supported by the support rollers 21, 22, and 23 so that a state illustrated in FIG. 1 is held. The belt 20 is rotated counterclockwise in FIG. 1 as the support rollers 21 are rotated. The belt 20 temporarily carries an image of toner which is to be formed on the print sheet on a surface (hereinafter referred to as an image carrier surface) located outside. That is, the belt 20 is an example of an image carrier. In the belt 20, for example, semiconductive polyimide is used from the viewpoint of heat resistance and abrasion resistance.

Each of the image forming units 24-1 to 24-4 includes a photoreceptor, a charging roller, a developing unit, a transfer roller, and a cleaner and forms an image in conformity with an electrographic scheme in cooperation with the exposure unit 27. The image forming units 24-1 to 24-4 are located along the belt 20 so that axial directions of the photoreceptors are parallel to each other. The image forming units 24-1 to 24-4 have the same structure and operation except for colors of toner to be used. The image forming unit 24-1 forms an element image, for example, using the toner of black. The image forming unit 24-2 forms an element image, for example, using the toner of cyan. The image forming unit 24-3 forms an element image, for example, using the toner of magenta. The image forming unit 24-4 forms an element image, for example, using the toner of yellow. Thus, each of the image forming units 24-1 to 24-4 is an example of the forming unit. The image forming units 24-1 to 24-4 form the element images of the colors so that the element images are piled on the image carrying surface of the belt 20. Accordingly, the image forming units 24-1 to 24-4 form color images in which the element images of the colors are piled on the image carrying surface of the belt 20 if the image forming unit 24-1 is passed.

The toner bottles 25-1 to 25-4 contain the toner to be supplied to the image forming units 24-1 to 24-4, respectively. That is, the toner bottle 25-1 contains, for example, the toner of black. The toner bottle 25-2 contains, for example, the toner of cyan. The toner bottle 25-3 contains, for example, the toner of magenta. The toner bottle 25-4 contains, for example, the toner of yellow.

The supply mechanisms 26-1 to 26-4 supply the toner contained in the toner bottles 25-1 to 25-4 to the image forming units 24-1 to 24-3, respectively. The supply mechanisms 26-1 to 26-4 include pipe lines connected to the image forming units 24-1 to 24-4 from the toner bottles 25-1 to 25-4 and conveyance mechanisms moving the toner to the pipe lines, and are simplified as indicated by dotted lines in FIG. 1.

The exposure unit 27 exposes the photoreceptors of the image forming units 24-1 to 24-4 in accordance with image data indicating the element images of the colors. As the exposure unit 27, a laser scanner, a light-emitting diode (LED) head, or the like is used. The exposure unit 27 includes, for example, a semiconductor laser element, a polygon mirror, an image forming lens system, and a mirror if the laser scanner is used. In this case, the exposure unit 27 causes, for example, a laser beam emitted from the semiconductor laser element in accordance with the image data to be selectively incident on the photoreceptors of the image forming units 24-1 to 24-4 by switching an emission direction by a mirror. The exposure unit 27 scans the foregoing laser beam in the axial direction (a depth direction in FIG. 1) of the photoreceptor by the polygon mirror.

The transfer roller 28 is disposed in parallel to the support roller 23 and pinches the belt 20 with the support roller 23. The transfer roller 28 pinches a print sheet sent from the resist rollers 14 with the image carrier surface of the belt 20. Then, the transfer roller 28 transfers the images of the toner formed on the image carrier surface of the belt 20 to the print sheet using an electrostatic force. That is, a transfer unit is formed by the support roller 23 and the transfer roller 28. The toner which is not transferred to the print sheet remains on the image carrier surface of the belt 20 in some cases. Therefore, the toner attached to the image carrier surface of the belt 20 after the toner is passed between the support roller 23 and the transfer roller 28 is removed by a cleaner (not illustrated) until the toner reaches the image forming unit 24-4.

Thus, the printing engine 2 forms an image on the print sheet sent by the resist rollers 14 in conformity with the electrographic scheme.

The fixing unit 3 includes a fixing roller 30 and a pressure roller 31.

The fixing roller 30 accommodates a heater in a hollow roller formed of, for example, a heat-resistive resin. The heater is, for example, an induction heating (IH) heater, but any other type of heater may be used appropriately. The fixing roller 30 fixes the toner to the print sheet by melting the toner attached to the print sheet sent from the printing engine 2.

The pressure roller 31 is provided with pressurized against the fixing roller in parallel to the fixing roller 30. The pressure roller 31 pinches the print sheet sent from the printing engine 2 with the fixing roller 30 to press the print sheet against the fixing roller 30.

The ADU 4 includes a plurality of rollers and selectively performs the following two operations. A first operation is an operation of sending the print sheet passing through the fixing unit 3 toward the sheet discharging tray 5 as it is. The first operation is performed if one-sided printing or double-sided printing is completed. A second operation is an operation of temporarily conveying the print sheet passing through the fixing unit 3 toward the sheet discharging tray 5 and then switching back and sending the print sheet to the printing engine 2. The second operation is performed if an image is completed on only one side in the double-sided printing.

The sheet discharging tray 5 receives the print sheet on which the image is formed and which is discharged.

Figure 2:
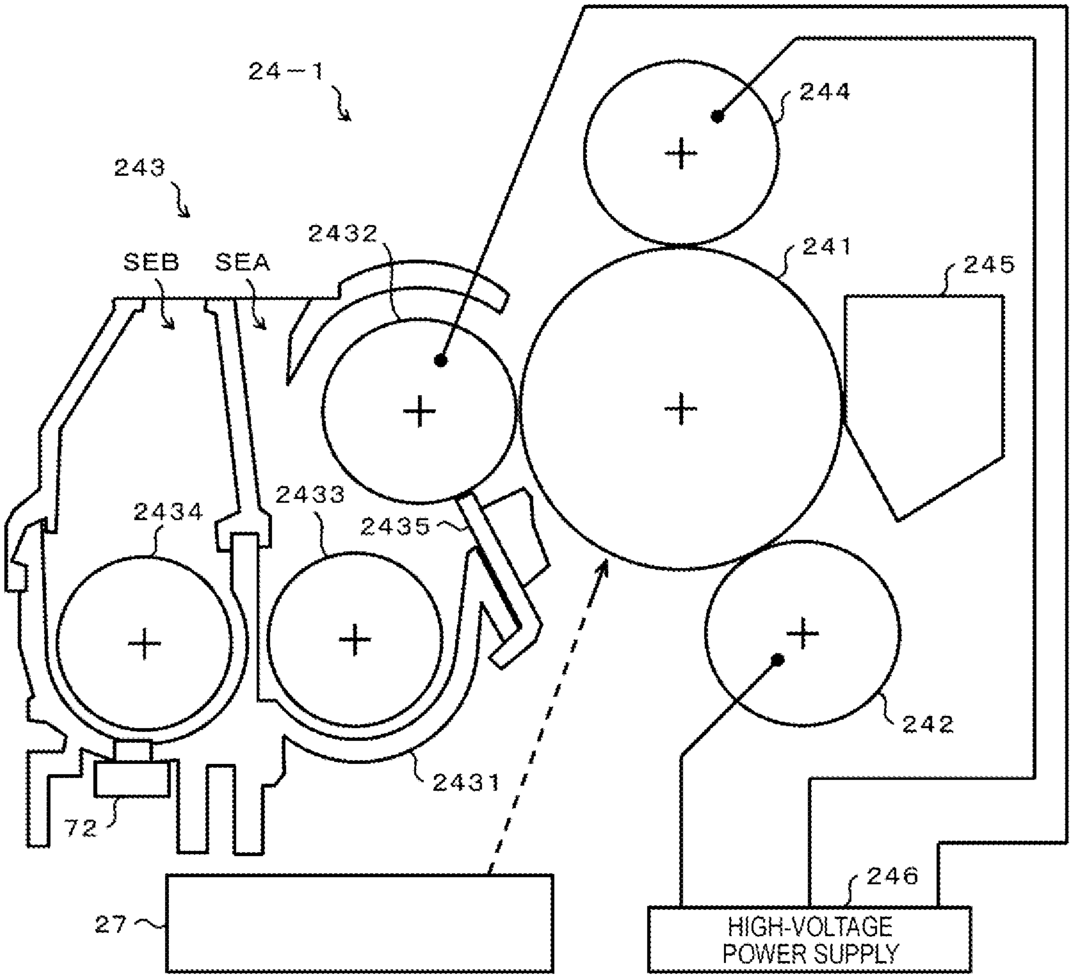
FIG. 2 is a partial breakaway diagram illustrating a configuration of main units of an image forming unit in FIG. 1.

FIG. 2 is a partial breakaway diagram illustrating a configuration of main units of the image forming units 24-1 to 24-4.

The image forming unit 24-1 to 24-4 have the same configuration. Therefore, only the configuration of the image forming unit 24-1 is illustrated in FIG. 2 and the configuration of the image forming units 24-2 to 24-4 are not illustrated and will not be described.

The image forming unit 24-1 is configured such that a charging roller 242, a developing unit 243, a transfer roller 244, and a cleaner 245 are disposed around a photoreceptor 241. The image forming unit 24-1 includes a high-voltage power supply 246.

The photoreceptor 241 is configured such that a photosensitive layer is formed by applying a photosensitive conductive material to a curved surface of a base in which a conductor such as aluminum is formed in a cylindrical shape. The surface of the photoreceptor 241 on which the photosensitive layer is formed is referred to as a photosensitive surface. The photoreceptor 241 is rotatably supported by a casing of the image forming unit 24-1 at a posture directed at an axial direction in the depth direction of FIG. 2.

In the charging roller 242, a conductor such as a conductive rubber is formed in a columnar shape. The charging roller 242 is rotatably supported by a casing or the like of the image forming unit 24-1 at a posture directed at an axial direction in the depth direction of FIG. 2. A curved surface of the charging roller 242 comes into contact with or approaches the photosensitive surface of the photoreceptor 241. The charging roller 242 is supplied with a charging voltage from the high-voltage power supply 246 and uniformly charges the photosensitive surface of the photoreceptor 241. Instead of the charging roller 242, for example, another type of electrostatic charger such as a scorotron system may be used to uniformly charge the photosensitive surface of the photoreceptor 241.

The developing unit 243 includes a casing 2431, a developing sleeve 2432, mixers 2433 and 2434, and a doctor blade 2435.

The casing 2431 forms a space where developer is contained inside. That is, the casing 2431 functions as a developer container that contains the developer. The inner space of the casing 2431 is partitioned into partitions SEA and SEB. The partitions SEA and SEB are connected via an aperture which is not illustrated in FIG. 3. Appropriate developer in the developing unit 243 is of a 2-component type in which toner and magnetic carrier are mixed.

Figure 3:
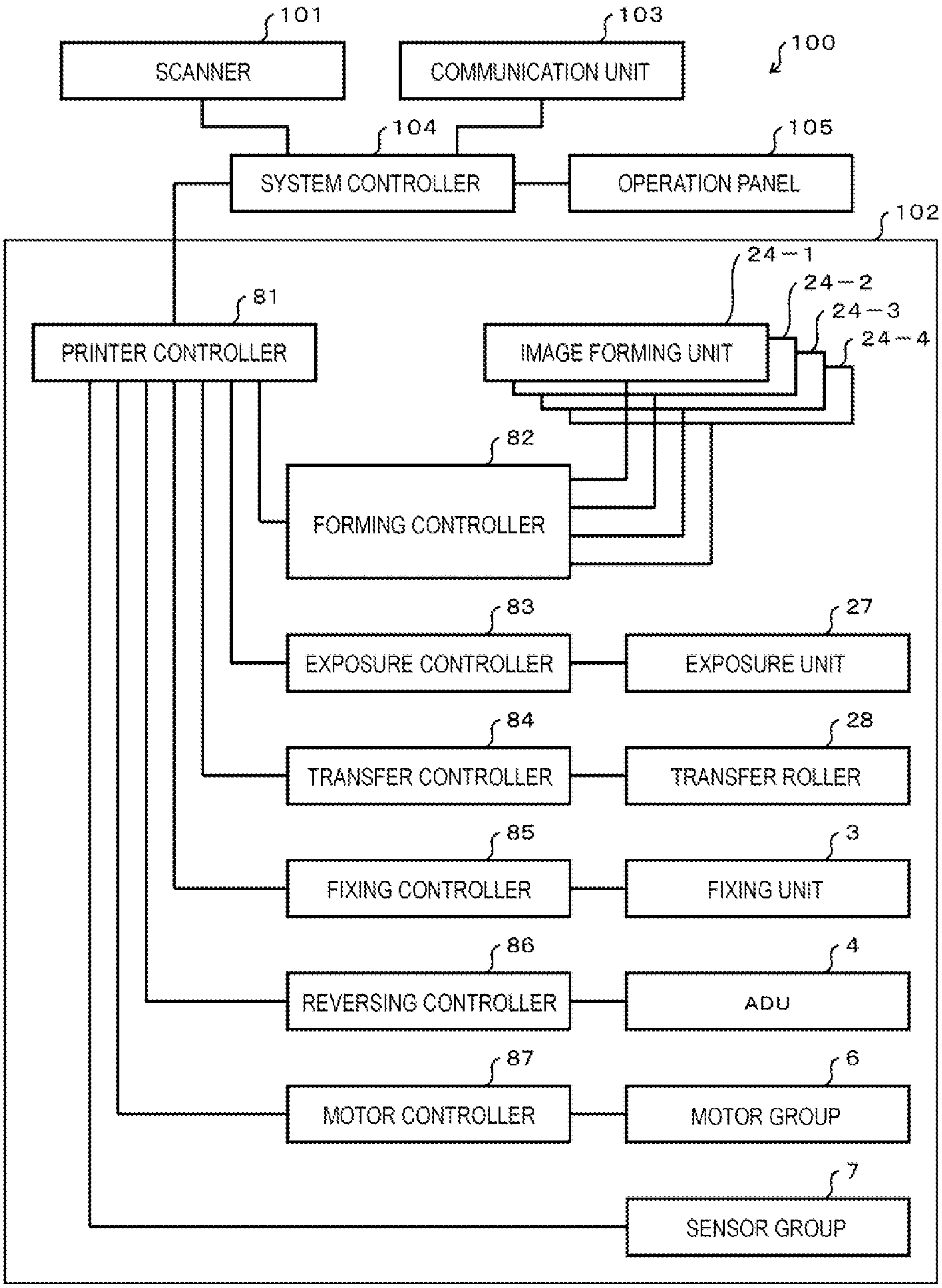
FIG. 3 is a block diagram schematically illustrating a configuration related to control of the MFP in FIG. 1.

The developing sleeve 2432 is formed in a columnar shape and is rotatably supported by the casing 2431 at a posture directed at an axial direction in a depth direction of FIG. 3 and in a state where a part of the developing sleeve 2432 is located in the partition SEA. The developing sleeve 2432 includes a magnet formed magnetic poles alternately in a circumferential direction along the circumferential surface. The developing sleeve 2432 is supplied with a developing bias from the high-voltage power supply 246 and attaches the toner to the photosensitive surface of the photoreceptor 241 electrostatically in accordance with an electrostatic latent image formed on the photosensitive surface. A potential difference between a potential of the developing sleeve 2432 formed with the supplied developing bias and a potential of the photosensitive surface of the photoreceptor 241 after exposure is referred to as a development contrast potential. As the development contrast potential is larger, more toner is attached to the photosensitive surface of the photoreceptor 241.

The mixers 2433 and 2434 are configured such that a stirring bar is mounted on a rotational shaft. The mixer 2433 is rotatably supported by the casing 2431 at a posture directed at the axial direction of the rotational shaft in the depth direction of FIG. 2 and in a state where the mixer 2433 is located near the bottom of the partition SEA. The mixer 2434 is rotatably supported by the casing 2431 at a posture directed at the axial direction of the rotational shaft in the depth direction of FIG. 2 and in a state where the mixer 2434 is located near the bottom of the partition SEB. In the mixers 2433 and 2434, the stirring bars are rotated in areas indicated by circles in FIG. 2 with rotation around the rotational shaft.

The mixer 2433 protrudes in front of FIG. 2 from the developing sleeve 2432 and the toner supplied to the image forming unit 24-1 by the supply mechanism 26-1 is sent to the periphery of the protrusion portion. The toner sent in this way is mixed with the developer contained in the partition SEA. The developer is sent from the partition SEA to the partition SEB with the rotation of the mixer 2433. The developer is sent from the front of FIG. 2 to the rear of FIG. 2 in the partition SEB with the rotation of the mixer 2434, and then is sent from the partition SEB to the partition SEA in the rear of FIG. 2. The developer is carried from the rear of FIG. 2 to the front of FIG. 2 in the partition SEA with the rotation of the mixer 2433. During this process, the developer is stirred and charged as the toner and the magnetic carrier are uniformly mixed.

The doctor blade 2435 is formed in a plate form and is fixed to the casing 2431 in a state where the tip end approaches the curved surface of the developing sleeve 2432. The doctor blade 2435 limits an amount of developer moved outside of the casing 2431 from the partition SEA with the rotation of the developing sleeve 2432.

The transfer roller 244 is formed in a columnar shape and is rotatably supported by the casing or the like of the image forming unit 24-1 at a posture directed at the axial direction in the depth direction of FIG. 2. The transfer roller 244 faces the photoreceptor 241 and pinches the belt 20 with the photosensitive surface of the photoreceptor 241. The belt 20 is not illustrated in FIG. 2. The transfer roller 244 is supplied with the transfer bias from the high-voltage power supply 246 and electrostatically transfers the toner attached to the photosensitive surface of the photoreceptor 241 to the belt 20.

The cleaner 245 includes a cleaning blade of which a tip end comes into contact with or approaches the photosensitive surface of the photoreceptor 241. The cleaner 245 scrapes off the toner remaining on the photosensitive surface by the cleaning blade to collect the toner.

FIG. 3 is a block diagram schematically illustrating a configuration related to control of the MFP 100. In FIG. 3, the same elements as those illustrated in FIG. 1 are denoted by the same reference numerals, and detailed description thereof will be omitted.

The MFP 100 includes a communication unit 103, a system controller 104, and an operation panel 105 in addition to the scanner 101 and the printer 102.

The communication unit 103 performs a process of communicating with an information terminal such as a computer apparatus and an image terminal such as a facsimile apparatus via a communication network such as a local area network (LAN) and a public communication network.

To implement an expected operation of the MFP 100, the system controller 104 generally controls each unit provided in the MFP 100. The expected operation of the MFP 100 is, for example, an operation of implementing various functions implemented by a known MFP.

The operation panel 105 includes an input device and a display device. The operation panel 105 inputs an instruction if an operator gives the instruction with the input device. The operation panel 105 displays various types of information of which the operator is notified on the display device. As the operation panel 105, for example, a touch panel, any of various switches, any of various lamps, or the like can be used singly or in appropriate combination.

The fixing unit 3, the ADU 4, the image forming units 24-1 to 24-4, the exposure unit 27, and the transfer roller 28 provided in the printer 102, as described above, are control target elements. In addition to these elements, the printer 102 includes a motor group 6 as a control target element. The motor group 6 incudes a plurality of motors that rotate a roller provided in the ADU 4 and various rotators provided in the pickup rollers 11-1, 11-2, and 11-3, the conveyance rollers 12-1, 12-2, and 12-3, the conveyance rollers 13, the resist rollers 14, the support roller 21, the transfer roller 28, the fixing roller 30, and the image forming units 24-1 to 24-4. The motor group 6 also includes a toner conveyance motor that individually operates a conveyance mechanism provided in each of the supply mechanisms 26-1 to 26-4.

The printer 102 further includes a sensor group 7, a printer controller 81, a forming controller 82, an exposure controller 83, a transfer controller 84, a fixing controller 85, a reversing controller 86, and a motor controller 87.

The sensor group 7 includes various sensors that monitor operation states of the apparatus. As illustrated in FIG. 1, the sensor group 7 includes an attachment amount sensor 71 faced the image carrier surface of the belt 20 between the image forming unit 24-1 and the transfer roller 28. The attachment amount sensor 71 measures an amount of toner attached to the image carrier surface of the belt 20, that is, an attachment amount of toner to the belt 20 in an image forming operation. As the attachment amount sensor 71, for example, an optical sensor measuring the attachment amount as a reflection amount of light can be used. The attachment amount sensor 71 is an example of a second measurement unit. As illustrated in FIG. 2, the sensor group 7 includes a density sensor 72 mounted on the bottom of the partition SEB of the casing 2431. The density sensor 72 measures a density of the toner in the developer. The density sensor 72 is an example of a first measurement unit.

The printer controller 81 generally controls each unit provided in the printer 102 to implement an expected operation of the printer 102 under the control of the system controller 104.

The forming controller 82, the exposure controller 83, the transfer controller 84, the fixing controller 85, the reversing controller 86, and the motor controller 87 all operate under the control of the printer controller 81 to control operations of the image forming units 24-1 to 24-4, the exposure unit 27, the transfer roller 28, the ADU 4, and the motor group 6.

Figure 4:
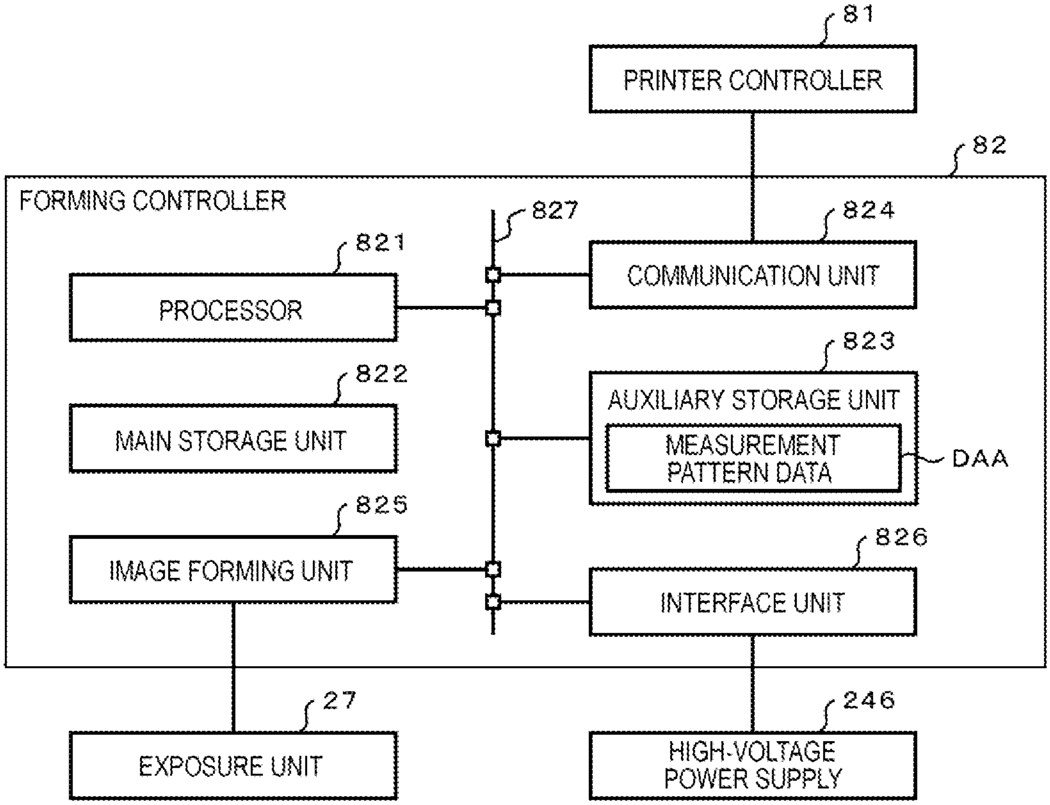
FIG. 4 is a block diagram illustrating a configuration of main units of an image controller in FIG. 3.

FIG. 4 is a block diagram illustrating a configuration of main units of the image controller 82.

The forming controller 82 includes a processor 821, a main storage unit 822, an auxiliary storage unit 823, a communication unit 824, an image forming unit 825, an interface unit 826, and a transmission path 827.

The processor 821, the main storage unit 822, and the auxiliary storage unit 823 are connected via the transmission path 827 to configure a computer that performs information processing to control the image forming units 24-1 to 24-4.

The processor 821 corresponds to a central portion of the computer. The processor 821 implements information processing to be described below in accordance with an information processing program such as an operating system, middleware, and an application program.

The main storage unit 822 corresponds to a main storage portion of the computer. The main storage unit 822 includes a nonvolatile memory area and a volatile memory area. The main storage unit 822 stores an information processing program in the nonvolatile memory area. The main storage unit 822 stores data necessary to perform a process by the processor 821 to control each unit in the nonvolatile memory area or the volatile memory area in some cases. The main storage unit 822 uses the volatile memory area as a work area where data can be appropriately rewritten by the processor 821.

The auxiliary storage unit 823 corresponds to an auxiliary storage portion of the computer. As the auxiliary storage unit 823, for example, known storage devices such as electric erasable programmable read-only memory (EEPROM), a hard disc drive (HDD), and a solid-state drive (SSD) can be used singly or in plural combination. The auxiliary storage unit 823 stores data used for the processor 821 to perform various processes or data generated in a process by the processor 821. The auxiliary storage unit 823 stores an information processing program. The auxiliary storage unit 823 stores measurement pattern data DAA to be described below as the data used for the processor 821 to perform various processes.

The communication unit 824 communicates with the printer controller 81.

Four image forming unit 825 corresponding to the image forming units 24-1 to 24-4 are provided in the forming controller 82. The four image forming units 825 process element images formed by the corresponding image forming units as processing targets. That is, for example, the image forming unit 825 corresponding to the image forming unit 24-1 processes a black element image as a processing target. In FIG. 4, only one image processing unit 825 is illustrated and the other three image processing units 825 are not illustrated. If print target image data indicates a color image, the four image processing units 825 generate element image data indicating an element image of each color and supply the element image data to the exposure unit 27 to perform exposure in accordance with the element image of each color.

The interface unit 826 performs interface processing to control the high-voltage power supply 246 by the processor 821.

The transmission path 827 includes an address bus, a data bus, and a control signal line and transmits data and control signals transmitted and received between the connected units.

Next, an operation of the MFP 100 that has the foregoing configuration will be described. Content of various operations and various processes to be described below is an example, an order of some of the operations and the processes can be appropriately changed, some of the operations and the processes can be appropriately omitted, or other operations and processes can be appropriately added.

Operations different from operations of the same type of known MFP will be described below and the other operations will not be described. A characteristic operation of the MFP 100 according to the embodiment is an operation of the forming controller 82.

If an image is formed by carrying out work involved in an image formed in the MFP 100, the toner in the developer contained in the inner space of the casing 2431 is consumed and toner density is changed in the developing unit 243 provided in each of the image forming units 24-1 to 24-4. A change in a toner density is indicated as a change in magnetic permeability in the developer. Accordingly, the density sensor 72 measures a toner density as magnetic permeability related to the developer present near the bottom of the partition SEB in the inner space of the casing 2431 and outputs a measurement value of the toner density (hereinafter referred to as a density measurement value).

Figure 5:
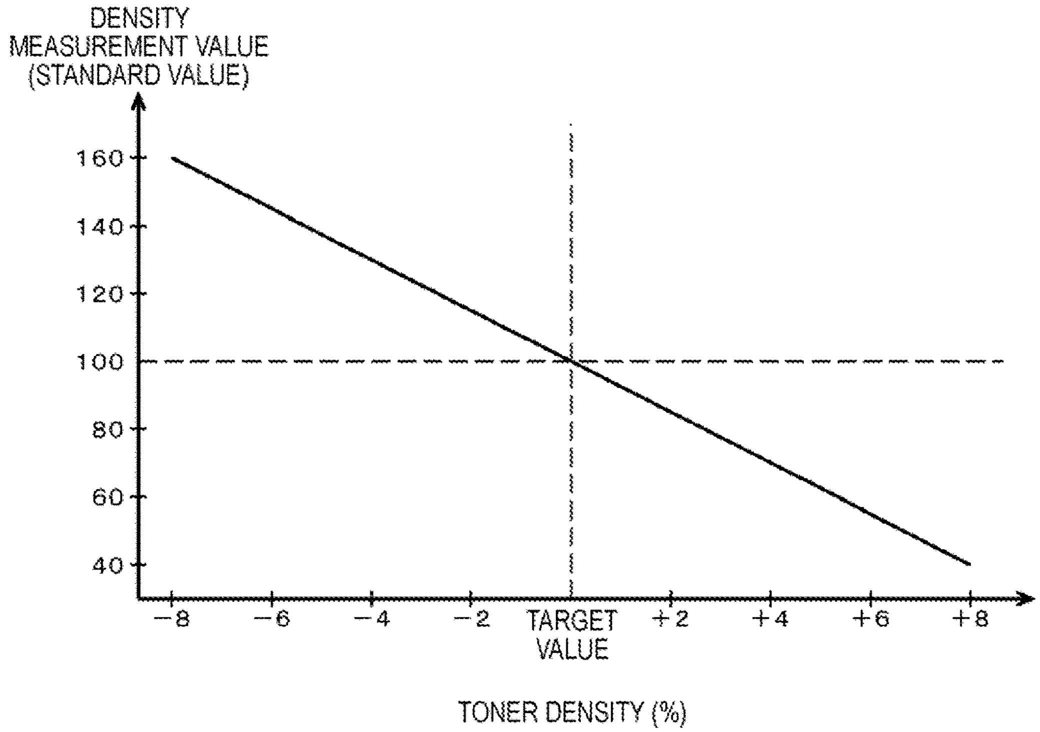
FIG. 5 is a diagram illustrating a relationship between a toner density and a density measurement value.

FIG. 5 is a diagram illustrating a relationship between a toner density and a density measurement value.

The density measurement value in FIG. 5 indicates a standardized value so that the density measurement value is "100" if the toner density is a target value (hereinafter referred to as a density target value).

As the toner density decreases, a ratio of the magnetic carrier in the developer conversely increases. Therefore, magnetic permeability increases and the density measurement also increases, as illustrated in FIG. 5.

In the forming controller 82, at a predetermined density adjustment timing, the processor 821 starts information processing to adjust the toner density related to the developer contained in the developing unit 243 (hereinafter referred to as a density adjustment process) in accordance with an information processing program stored in the main storage unit 822 or the auxiliary storage unit 823. The density adjustment timing is assumed to be a timing after a process of forming an image is started, as an example. Here, the density adjustment timing may be appropriately determined by, for example, a designer or the like of the MFP 100. The processor 821 sets each of the image forming units 24-1 to 24-4 and individually performs the density adjustment process. Here, the density adjustment process of which a target is the image forming unit 24-1 will be described. Accordingly, all various devices in description of the following density adjustment process are devices related to the image forming unit 24-1. That is, for example, in description of the "density sensor 72," the density sensor 72 refers to the density sensor 72 provided in the developing unit 243 of the image forming unit 24-1.

Figure 6:
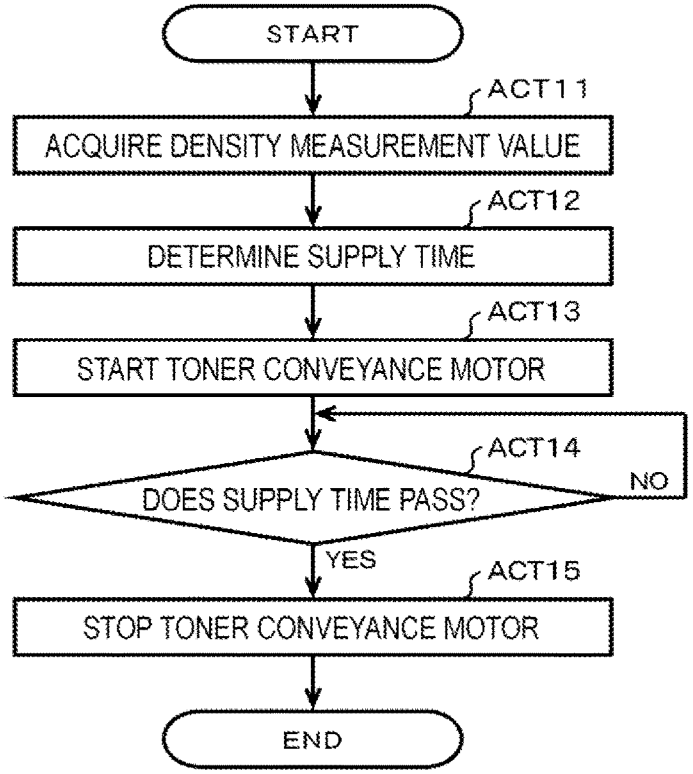
FIG. 6 is a flowchart illustrating a density adjustment process.

FIG. 6 is a flowchart illustrating a density adjustment process.

In ACT11, the processor 821 acquires a density measurement value output by the density sensor 72.

In ACT12, the processor 821 determines a toner supply time for adjusting a toner density to a density target value. That is, the processor 821 determines, as a supply time, a time necessary for the supply mechanism 26-1 to supply an amount of toner supplied to the developing unit 243 in order to compensate for a difference between density measurement value acquired in ACT11 and a density measurement value output by the density sensor 72 if the toner density is the density target value. For example, the processor 821 determines the supply time as a time obtained through predetermined calculation. However, for example, a specific process of determining the supply time, such as a process of determining the supply time with reference to a data table indicating a relationship between the density measurement value and the supply time, may be determined appropriately by, for example, the designer or the like of the MFP 100.

In ACT13, the processor 821 starts the toner conveyance motor. Specifically, the processor 821 requests the printer controller 81 to start the corresponding toner conveyance motor. In accordance with an instruction from the printer controller 81 in response to this request, the motor controller 87 starts driving the toner conveyance motor provided in the motor group 6. If the toner conveyance motor operates and the supply mechanism 26-1 is driven, the supply mechanism 26-1 supplies an amount of toner per unit time from the toner bottle 25-1 to the developing unit 243. Thus, the supply mechanism 26-1 and the toner conveyance motor corresponding to the supply mechanism 26-1 form a supply unit that supplies the toner to the developing unit 243 provided in the image forming unit 24-1.

In ACT14, the processor 821 waits for the supply time determined in ACT12 after the toner conveyance motor is started in ACT13. If the processor 821 can confirm that the supply time passes, YES is determined and the process moves to ACT15.

In ACT15, the processor 821 stops the toner conveyance motor. Specifically, the processor 821 requests the printer controller 81 to stop the corresponding toner conveyance motor. In accordance with an instruction from the printer controller 81 in response to this request, the motor controller 87 ends the driving of the toner conveyance motor.

Then, the processor 821 thus ends the present density adjustment process. The processor 821 repeats the foregoing density adjustment process every density adjustment timing to compensate for a change in the toner density involved in the toner consumed in the image forming and maintain the toner density so that the toner density does not considerably deviate from the density target value.

Thus, the processor 821 performs the density adjustment process based on the information processing program, so that a computer including the processor 821 as a central portion functions as a control unit that controls the toner supply to approach the toner density to the density target value.

On the other hand, the processor 821 starts information processing to adjust the development contrast potential (hereinafter referred to as a contrast adjustment process) every predetermined contrast adjustment timing in accordance with the information processing program stored in the main storage unit 822 or the auxiliary storage unit 823. The contrast adjustment timing is assumed to be, for example, a timing after end of the image forming work after the accumulated number of times the image is formed after completion of the previous contrast adjustment process reaches a given number such as several thousands. That is, the processor 821 starts the contrast adjustment process in a state where the image forming work is not performed. Here, the contrast adjustment timing may be determined appropriately by, for example, the designer or the like of the MFP 100.

Figure 7:
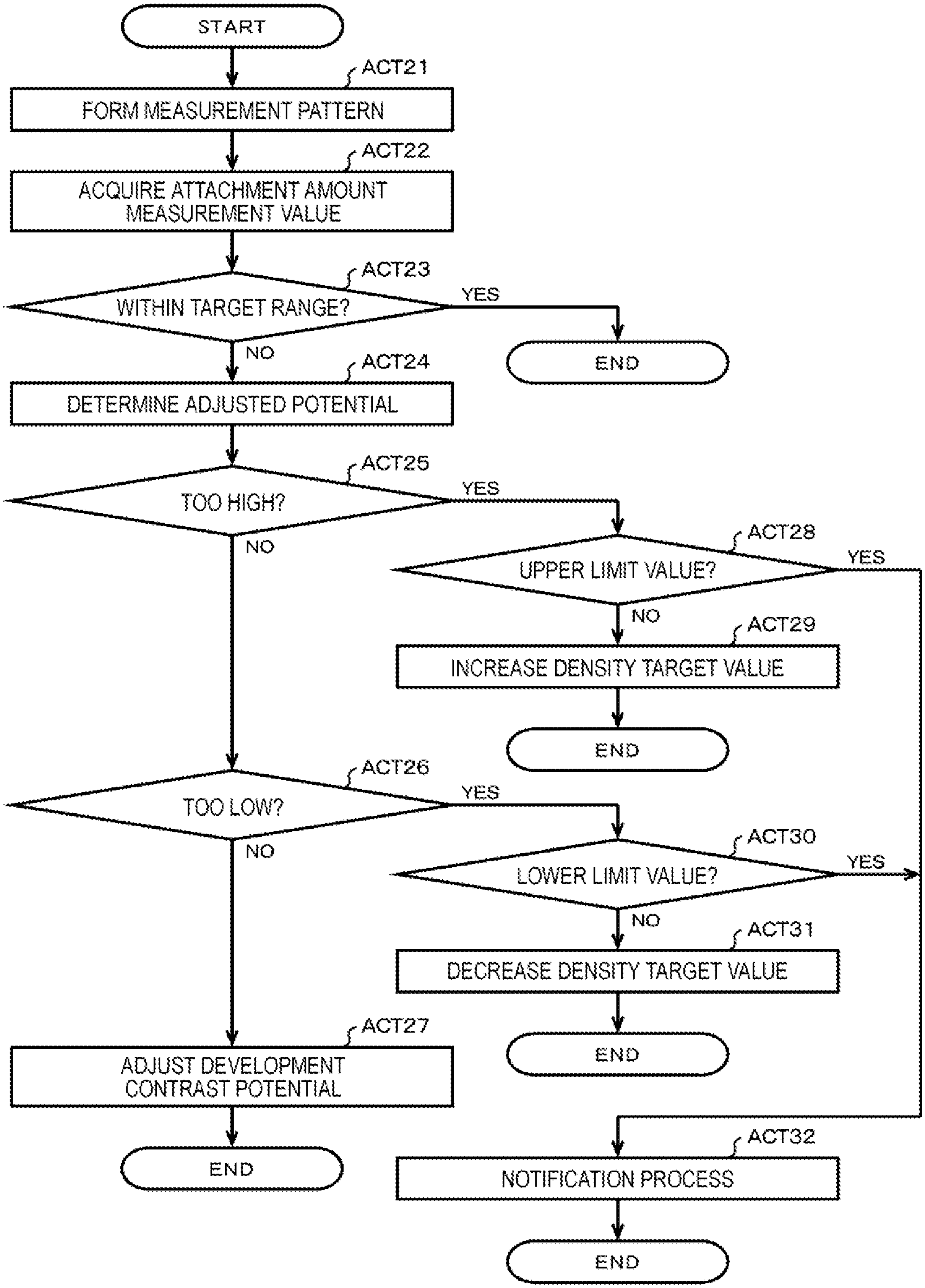
FIG. 7 is a flowchart illustrating a contrast adjustment process.

FIG. 7 is a flowchart illustrating a contrast adjustment process.

In ACT21, the processor 821 forms a measurement pattern. For example, the processor 821 starts operations of the image forming units 24-1 to 24-4, then reads the measurement pattern data DAA stored in the auxiliary storage unit 823, and gives the measurement pattern data DAA to the image processing unit 825. A measurement pattern indicated by the measurement pattern data DAA is considered to be a pattern in which an image with a density value determined in advance for each color is formed in an area on the image carrier surface of the belt 20 passing through a measurement position by the attachment amount sensor 71. Any density value may be determined by, for example, the designer or the like of the MFP 100.

The measurement pattern data DAA is processed by the image forming unit 825 and is then supplied to the exposure unit 27. The measurement pattern is formed on the image carrier surface of the belt 20 through a known forming operation by the image forming units 24-1 to 24-4 and the exposure unit 27. If the area where the measurement pattern is formed on the image carrier surface of the belt 20 passes through the measurement position by the attachment amount sensor 71, an attachment amount of toner of each color is sequentially measured by the attachment amount sensor 71.

If the measurement pattern is formed, the processor 821 does not send a print sheet between the support roller 23 and the transfer roller 28. That is, the measurement pattern is not printed on the print sheet.

In ACT22, the processor 821 acquires each measurement value of the attachment amount related to the above-described measurement pattern in the attachment amount sensor 71 (hereinafter referred to an attachment amount measurement value). The processor 821 may calculate a difference between an output value of the attachment amount sensor 71 on the image carrier surface of the belt 20 in a toner-unattached state and an output value of the attachment amount sensor 71 if the area where the measurement pattern is formed passes through the measurement position by the attachment amount sensor 71, and may acquire the difference as an attachment amount measurement value.

Processes after the contrast adjustment process are performed on each of the image forming units 24-1 to 24-4 as a target. Since all the processes are the same process, only a process performed on the image forming unit 24-1 as a target will be described below. Accordingly, all various devices in description of the following contrast adjustment process are devices related to the image forming unit 24-1.

In ACT23, the processor 821 confirms whether the attachment amount measurement value acquired in ACT22 is within a predetermined target range. The target range is determined in consideration of a margin to some extent using an attachment amount for implementing a density value formed in the measurement pattern (hereinafter referred to as an appropriate attachment amount) as a reference. The specific target range may be appropriately determined, for example, by the designer of the MFP 100. If the processor 821 can confirm that the attachment amount measurement value is in the target range, YES is determined and the present contrast adjustment process ends as it is. That is, in this case, the development contrast potential is not adjusted.

If the processor 821 cannot confirm that the attachment amount measurement value is in the target range, NO is determined in ACT23 and the process moves to ACT24.

In ACT24, the processor 821 determines the adjusted development contrast potential (hereinafter referred to as an adjusted potential). That is, for example, the processor 821 compensates for a difference between the attachment amount measurement value corresponding to an appropriate attachment amount and the attachment amount measurement value acquired in ACT22 and determines the development contrast potential for implementing the appropriate attachment amount as an adjusted potential.

Figure 8:
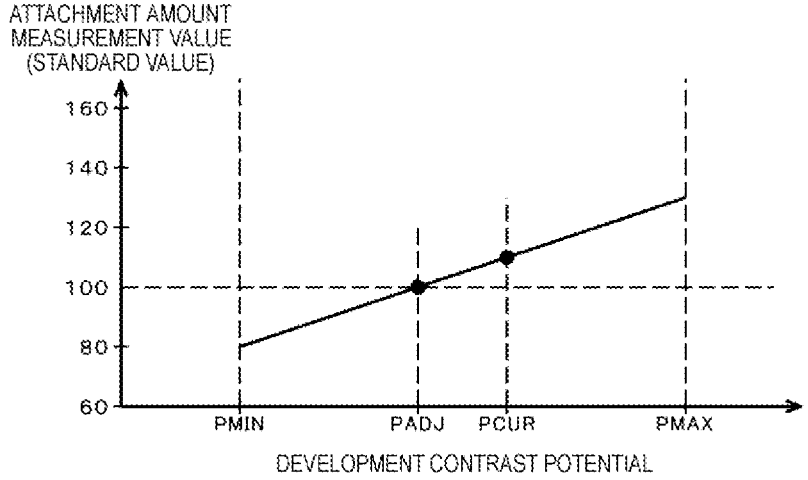
FIG. 8 is a diagram illustrating a concept for determining an adjusted potential.

FIG. 8 is a diagram illustrating a concept for determining an adjusted potential.

FIG. 8 illustrates a relationship between the development contrast potential and the attachment amount measurement value at a certain time. The attachment amount measurement value in FIG. 8 indicates a value standardized so that an attachment amount measurement value corresponding to the appropriate attachment amount is "100".

A development contrast potential PCUR is a development contrast potential if the attachment amount measurement value acquired in ACT22 is measured. A development contrast potential PADJ is an adjusted potential. That is, in the example of FIG. 8, the development contrast potential PADJ lower than the development contrast potential PCUR is determined as the adjusted potential.

In ACT25, the processor 821 confirms that the adjusted potential determined in ACT24 is too high to the extent that the adjusted potential exceeds a range in which the development contrast potential can be adjusted. Here, in the embodiment, the development contrast potential is adjusted by changing a development bias, as will be described below. However, there is a limitation of a range in which the development bias can be changed depending on the specification of the high-voltage power supply 246 and there is a restriction of an adjustable range of the development contrast potential. Accordingly, if the adjusted potential is equal to or less than a predetermined maximum potential of the adjustable range of the development contrast potential, the processor 821 determines that the adjusted potential is not too high, determines NO, and moves to ACT26.

It is assumed that, in consideration of deterioration in image quality or the like, the adjustable range of the development contrast potential is set to be narrower than an adjustment range implemented by a change in a development bias in a changeable range of the development bias depending on the specification of the high-voltage power supply 246.

In ACT26, the processor 821 confirms that the adjusted potential determined in ACT24 is too low to the extent that the adjusted potential exceeds a range in which the development contrast potential can be adjusted. Accordingly, if the adjusted potential is equal to or greater than the predetermined minimum potential of the adjustable range of the development contrast potential, the processor 821 determines that the adjusted potential is not too low, determines NO, and moves to ACT27.

In FIG. 8, PMAX and PMIN indicate a maximum potential and a minimum potential of the development contrast potential, respectively. Thus, the adjusted development contrast potential PADJ in the example of FIG. 8 is equal to or less than the maximum potential PMAX and equal to or greater than the minimum potential PMIN. Thus, in the case of the example of FIG. 8, the processor 821 determines NO in one of ACT25 and ACT26 and moves to ACT27.

In ACT27, the processor 821 controls the high-voltage power supply 246 such that the development bias is changed to change the development contrast potential to the adjusted potential determined in ACT24. Then, the processor 821 thus ends the present contrast adjustment process.

A potential of the photosensitive surface of the photoreceptor 241 after exposure (hereinafter referred to as a post-exposure potential) is changed in accordance with deterioration in the photoreceptor 241. Accordingly, the processor 821 determines the present post-exposure potential and then adjusts the development bias in accordance with magnitude causing a potential difference corresponding to the adjusted potential from the determined post-exposure potential. The processor 821, for example, determines the post-exposure potential based on a print number for which the photoreceptor 241 is used.

If the attachment amount measurement value is acquired after the development contrast potential is completed as the adjusted potential, the attachment amount measurement value indicates an attachment amount close to the appropriate measurement value. That is, the development contrast potential is adjusted so that the attachment amount measurement value is close to the appropriate attachment amount. Thus, if the processor 821 performs the contrast adjustment process based on the information processing program, a computer including the processor 821 as a central portion functions as a control unit.

Meanwhile, if the adjusted potential is greater than the maximum potential PMAX, the processor 821 determines that the adjusted potential is too high, determines YES in ACT25, and moves to ACT28.

In ACT28, the processor 821 confirms whether the present density target value in the density adjustment process is a predetermine upper limit value. The upper limit value will be described below. Then, if the density target value is not the upper limit, the processor 821 determines NO and moves to ACT29.

In ACT29, the processor 821 increases the density target value by a predetermined amount. For example, if the present density target value is N %, the processor 821 increases the density target value by N+1%. Here, the increase amount here may be determined appropriately by the designer or the like of the MFP 100. Then, the processor 821 thus ends the present contrast adjustment process.

Conversely, if the adjusted potential is less than the minimum potential PMIN, the processor 821 determines that the adjusted potential is too low, determines YES in ACT26, and moves to ACT30.

In ACT30, the processor 821 confirms whether the present density target value in the density adjustment process is a predetermined lower limit value. The lower limit value will be described below. If the density target value is not the lower limit value, the processor 821 determines NO and moves to ACT31.

In ACT31, the processor 821 decreases the density target value by a predetermined amount. For example, if the present density target value is N %, the processor 821 decreases the density target value to N−1%. Here, the decrease amount may be determined appropriately by the designer or the like of the MFP 100. Then, the processor 821 thus ends the present contrast adjustment process.

In this way, the processor 821 changes the target density in the toner density adjustment by increasing or decreasing the density target value. That is, if the processor 821 performs the contrast adjustment process based on the information processing program, a computer including the processor 821 as a central portion functions as a changing unit.

Figure 9:
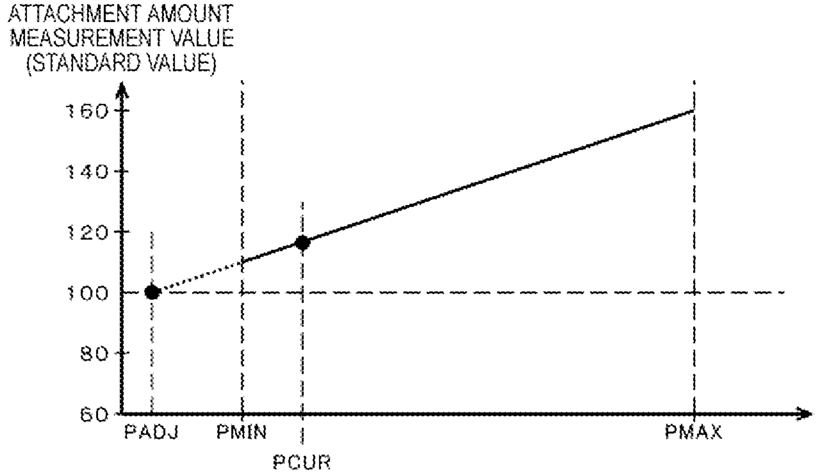
FIG. 9 is a diagram illustrating a relationship between a development contrast potential and an attachment amount measurement value at a certain time.

FIG. 9 is a diagram illustrating a relationship between a development contrast potential and an attachment amount measurement value at a certain time.

A relationship between the development contrast potential and the attachment amount is changed in accordance with a change in a surrounding environment such as humidity or all conditions such as deterioration in the image carrier, for example, as illustrated in FIGS. 8 and 9.

In the example of FIG. 9, the adjusted development contrast potential PADJ is less than the minimum potential PMIN. In this case, the processor 821 determines that the density target value is too low, determines YES in ACT26, and moves to ACT30. If the density target value is not the lower limit value, the density target value is decreased.

If the density target value is decreased, the toner density of the developer contained in the developing unit 243 is decreased through the subsequent density adjustment process. The decrease in the toner density is implemented by consuming the toner in the image forming work performed without supplying the toner in the density adjustment process. Here, the steep decrease in the toner density may be achieved by forming an image on the belt 20 without being involved in the image forming work and recovering the toner attached to the belt 20 by the cleaner (not illustrated).

Figure 10:
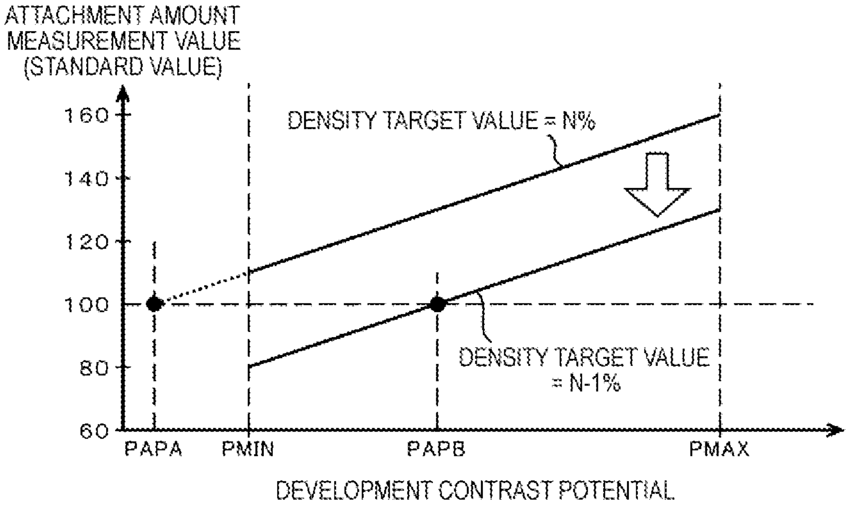
FIG. 10 is a diagram illustrating a state of a change in the attachment amount measurement value made as a toner density decrease.

FIG. 10 is a diagram illustrating a state of a change in the attachment amount measurement value made as a toner density decreases.

If only the toner density is changed among various image forming conditions, the attachment amount of the toner to the belt 20 decreases as the toner density decreases. Accordingly, as illustrated in FIG. 10, if the toner density decreases, the attachment amount measurement value decreases. Accordingly, the development contrast potential for implementing the appropriate attachment amount increases from a potential PAPA before the decrease in the toner density to a potential PAPB after the decrease in the toner density. The potential PAPB is in an adjustable range of the development contrast potential. That is, the adjustment of the toner attachment amount by the adjustment of the development contrast potential can continue.

Here, if the change in the toner density is repeated and the change amount of the toner density with respect to a reference value, there is concern of required image quality being unmaintainable. Accordingly, an upper limit value and a lower limit value of a target value of the toner density are determined in advance within a range in which the required image quality is maintainable. The upper limit value and the lower limit value are assumed to be, for example, +2% and −2% of an initial value of the target value of the toner density. However, the upper limit value and the lower limit value may be determined appropriately by, for example, the designer or the like of the MFP 100.

If the processor 821 moves from ACT25 to ACT28 because the adjusted potential is too high in the state where the toner density is set to the upper limit value, the processor 821 moves to ACT29. Further, because the density target value cannot be increased, the processor 821 determines YES in ACT28 and moves to ACT32.

If the processor 821 moves from ACT26 to ACT30 because the adjusted potential is too low in the state where the toner density is set to the lower limit value, the processor 821 moves to ACT31. Further, because the density target value cannot be decreased, the processor 821 determines YES in ACT30 and moves to ACT32.

In ACT32, the processor 821 performs a notification process of notifying a predetermined notification destination that the adjustment reaches a limitation in the contrast adjustment process. The notification destination is assumed to be a manager belonging to an organization using the MFP 100, a maintenance person responsible for maintenance of the MFP 100, a management operator responsible for management work of the MFP 100. The notification destination may be determined fixedly by the designer or the like of the MFP 100 or may be able to be set appropriately in accordance with a desire of a user or the like.

Here, if the notification process is performed, there is a situation where the MFP 100 cannot adjust a formation density of an image any more, and thus there is concern of image quality of a subsequently formed image deteriorating. Therefore, it is desirable to set the maintenance person or the management operator as a notification destination and request speedy maintenance. Here, the notification destination may be a user actually using the MFP 100.

The notification process may be performed by any of various methods of notifying a remote notification destination, such as transmission of an electronic mail, a push notification to an information terminal, and an upload of predetermined data for notification to a server. Here, the notification process is not limited to the method of notifying a remote notification destination, but a method of notifying a direct operant of the MFP 100, such as display of a screen on the operation panel 105, may be adopted. Which notification process is performed may be determined fixedly by the designer or the like of the MFP 100 or may be able to be set appropriately in accordance with a desire of a user or the like. If the notification process is completed, the processor 821 thus ends the present contrast adjustment process.

For example, if data for notification (hereinafter referred to as notification data) is uploaded to a server, for example, the processor 821 generates the notification data and requests the system controller 104 to upload the notification data via the printer controller 81. The system controller 104 uploads the notification data to the server via the communication unit 103 in response to this request. However, the processor 821 may give only a notification request to the printer controller 81. In this case, the printer controller 81 generates notification data and requests the system controller 104 to upload the notification data. Alternatively, the processor 821 may give only a notification request to the system controller 104. In this case, the system controller 104 may generate notification data and upload the notification data to a server. That is, the notification process may be performed in cooperation with the formation controller 82, and the printer controller 81 and the system controller 104 or may be performed in cooperation with the forming controller 82 and the system controller 104.

If the processor 821 moves to ACT32, the development contrast potential is not adjusted. However, by performing maintenance on the MFP 100 in response to a request from a a notification person receiving by the foregoing notification process or by the determination of a person by herself or himself receiving the notification, the MFP 100 can quickly return to a state where an appropriate image can be formed.

As described above, the MFP 100 adjusts the attachment amount of toner on the image carrier involved in the image formation so that the attachment amount is in a target range around the appropriate attachment amount through the adjustment of the development contrast potential, while maintaining the toner density to the target density. In a situation where the development contrast potential at which the attachment amount of the toner is around the appropriate attachment amount cannot be set, the MFP 100 can adjust the toner density by changing the target density of the toner density adjustment to set the development contrast potential at which the attachment amount of the toner is around the appropriate attachment amount by adjusting the toner density. Accordingly, it is possible to keep the attachment amount of toner to the belt 20 in the image formation for a long time around the appropriate attachment amount, compared to a case in which only the development contrast potential or only the toner density is adjusted.

Incidentally, if the target density is changed, it is necessary to wait for progress of the supply of the toner or consumption to some extent until the target density is changed and then the toner density becomes around the target density, and thus it takes some time. In particular, if the target density decreases and an arrival of the toner density at the target density is awaited due to consumption of the toner in execution of normal image forming work, there is concern of much time being required until the toner density becomes the target density. Independently of normal image forming work, an image is formed on the belt 20. If the toner is steeply consumed, a time until the toner density becomes the target density can be shortened, but the toner may be wasted. However, in the MFP 100, the development contrast potential is mainly adjusted. Therefore, the attachment amount can reliably approach the appropriate attachment amount in a short time and the toner is not wasted.

In the MFP 100, the upper limit value and the lower limit value of the density target value are determined in advance and the target density is not changed beyond the upper limit value and the lower limit value. Accordingly, it is possible to prevent the toner density from forming an image with poor quality as a result that the toner density is considerably distant from the appropriate density.

In the MFP 100, if the density target value reaches the upper limit value or the lower limit value, and thus cannot be changed when the density target value should be changed, a predetermined notification destination is notified of this. Accordingly, it is possible to encourage a state in which the appropriate image is formed by maintenance or the like.

The embodiment can be modified in the following various forms.

The attachment amount toner attached to the photoreceptor 241 may be measured.

Any of various apparatuses such as a copy machine, a printer, and a facsimile apparatus other than the MFP can perform the foregoing process as long as the apparatus forms an image in conformity with the electrographic scheme.

Some or all of the functions implemented by the processor 821 in information processing in the foregoing embodiment can also be implemented by hardware such as a logical circuit performing information processing which is not based on a program. Each of the foregoing functions can be implemented by hardware such as the foregoing logical circuit in combination of software control.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a forming component configured to form a toner image on an image carrier using developer which is contained in a developer container and includes toner and a magnetic carrier;

a supply component configured to supply the toner to the developer container;

a first measurement component configured to measure a density of the toner in the developer contained in the developer container;

a controller configured to control the supply component such that the density measured by the first measurement component approaches a target density;

a second measurement component configured to measure an image density formed by the forming component;

an adjustment component configured to adjust a development contrast potential so that a formation density measured by the second measurement component approaches a predetermined appropriate density with regard to the toner image formed by the forming component under a predetermined condition; and a changing component configured to change the target density if the adjustment component is not able to adjust the development contrast potential so that the formation density measured by the second measurement component approaches the predetermined appropriate density.

2. The image forming apparatus according to claim 1, wherein the changing component does not change the target density if a change amount with respect to a reference value of the target density reaches a defined amount.

3. The image forming apparatus according to claim 1, further comprising:

a notification component configured to perform a predetermined notification process if the adjustment component is not able to adjust the development contrast potential so that the formation density measured by the second measurement component approaches the predetermined appropriate density and if the change amount of the target density with respect to the reference value by the changing component reaches the defined amount.

4. The image forming apparatus according to claim 3, wherein the notification component performs a notification process of notifying a remote notification destination.

5. The image forming apparatus according to claim 4, wherein the notification component sets a person performing maintenance work as a notification destination.

6. The image forming apparatus according to claim 1, wherein the second measurement component measures the formation density as an attachment amount of toner in the image carrier.

7. The image forming apparatus according to claim 1, wherein the forming component includes a development sleeve and a high-voltage power supply applying a development bias, and wherein the adjustment component adjusts the development contrast potential in accordance with a magnitude of the development bias applied to the development sleeve from the high-voltage power supply.

8. The image forming apparatus according to claim 7, wherein the forming component includes a photoreceptor, and wherein the adjustment component determines a post-exposure potential of the photoreceptor and adjusts the development contrast potential as a potential difference between the post-exposure potential and a development bias applied from the high-voltage power supply.

9. The image forming apparatus according to claim 7, wherein the case where the adjustment component is not able to adjust the development contrast potential so that the formation density measured by the second measurement component approaches the predetermined appropriate density is a case where the formation density is not able to be approach the predetermined appropriate density even despite adjustment of the development bias.

10. The image forming apparatus according to claim 1, wherein the supply component is configured to supply four different colors of toner to the developer container.

11. An image forming method, comprising:

supplying toner to a developer container comprising developer which comprises toner and a magnetic carrier;

measuring a density of the toner in the developer contained in the developer container;

controlling the supplying of toner such that the density measured approaches a target density;

measuring an image density formed by a forming component;

adjusting a development contrast potential so that a formation density measured approaches a predetermined appropriate density with regard to the toner image formed by the forming component under a predetermined condition; and changing the target density if not able to adjust the development contrast potential so that the formation density measured approaches the predetermined appropriate density.

12. The image forming method according to claim 11, further comprising:

not changing the target density if a change amount with respect to a reference value of the target density reaches a defined amount.

13. The image forming method according to claim 11, further comprising:

performing a predetermined notification process if not able to adjust the development contrast potential so that the formation density measured approaches the predetermined appropriate density and if the change amount of the target density with respect to the reference value reaches the defined amount.

14. The image forming method according to claim 13, further comprising:

performing a notification process of notifying a remote notification destination.

15. The image forming method according to claim 14, further comprising:

setting a person performing maintenance work as a notification destination.

16. The image forming method according to claim 11, further comprising:

measuring the formation density as an attachment amount of toner in the image carrier.

17. The image forming method according to claim 11, further comprising:

adjusting the development contrast potential in accordance with a magnitude of a development bias applied to a development sleeve from a high-voltage power supply.

18. The image forming method according to claim 17, further comprising:

determining a post-exposure potential of a photoreceptor and adjusting the development contrast potential as a potential difference between the post-exposure potential and a development bias applied from the high-voltage power supply.

19. The image forming method according to claim 17, further comprising:

in a case where not able to adjust the development contrast potential so that the formation density measured approaches the predetermined appropriate density is a case where the formation density is not able to be approach the predetermined appropriate density even despite adjustment of the development bias.

20. The image forming method according to claim 11, further comprising:

supplying four different colors of toner to the developer container.

* * * * *